(12) United States Patent
Wang

(10) Patent No.: US 6,933,353 B2
(45) Date of Patent: Aug. 23, 2005

(54) OLEFIN POLYMERIZATION PROCESS

(75) Inventor: Shaotian Wang, Mason, OH (US)

(73) Assignee: Equistar Chemicals, LP, Houston, TX (US)

( * ) Notice: Subject to any disclaimer, the term of this patent is extended or adjusted under 35 U.S.C. 154(b) by 92 days.

(21) Appl. No.: 10/614,615

(22) Filed: Jul. 7, 2003

(65) Prior Publication Data

US 2005/0010004 A1 Jan. 13, 2005

(51) Int. Cl.$^7$ ............................ C08F 4/44; C08F 4/52
(52) U.S. Cl. ................. 526/114; 526/116; 526/161; 526/172; 526/148; 526/151; 526/130; 526/129; 526/348.5; 526/348.4; 526/348.6; 526/351; 526/352; 526/348.2
(58) Field of Search ................... 526/114, 116, 526/172, 161, 113, 126, 901, 943

(56) References Cited

U.S. PATENT DOCUMENTS

| | | | | |
|---|---|---|---|---|
| 4,370,456 A | * | 1/1983 | George | 502/110 |
| 6,177,527 B1 | | 1/2001 | Sishta et al. | 526/134 |
| 6,211,311 B1 | | 4/2001 | Wang et al. | 526/131 |
| 6,221,802 B1 | | 4/2001 | Costa et al. | 502/109 |
| 6,232,260 B1 | | 5/2001 | Nagy et al. | 502/155 |
| 6,440,889 B1 | | 8/2002 | Tsuie | 502/152 |
| 6,451,724 B1 | | 9/2002 | Nifant'ev et al. | 502/103 |
| 6,476,173 B1 | | 11/2002 | Lin et al. | 526/351 |
| 6,489,408 B2 | | 12/2002 | Mawson et al. | 526/68 |
| 6,524,986 B2 | | 2/2003 | Costa et al. | 502/109 |
| 6,541,583 B2 | | 4/2003 | Meverden et al. | 526/127 |
| 6,559,251 B1 | * | 5/2003 | Wang et al. | 526/127 |
| 6,765,074 B2 | * | 7/2004 | Sartain | 526/153 |

FOREIGN PATENT DOCUMENTS

| | | |
|---|---|---|
| WO | WO 01/53360 | 5/1999 |
| WO | WO 99/24446 | 7/2001 |

OTHER PUBLICATIONS

Soga et al., *Macromolecules 27* (1994) 7938–7940.
Buu–Hoi and Xuong, *J. Chem. Soc.* (1952) 2225.
Jüngling et al., *J. Organometal. Chem. 460* (1993) 191.
Noh, et al., *J. Organometal. Chem, 518* (1996) 1.
Noh, et al., *J. Organometal. Chem, 580* (1999) 90.

* cited by examiner

*Primary Examiner*—David W. Wu
*Assistant Examiner*—Rip A. Lee
(74) *Attorney, Agent, or Firm*—John Tyrell; Jonathan L. Schuchardt

(57) ABSTRACT

A method for preparing a supported organometallic complex is disclosed. An organometallic complex is combined with a support material that has been treated with an organozinc compound. The organometallic complex comprises a Group 3 to 10 transition metal and an indenoindolyl ligand that is bonded to the transition metal. Also disclosed is a process for polymerizing an olefin using the supported complex. Organozinc treatment of the support unexpectedly boosts catalyst activity and polyolefin molecular weight.

21 Claims, No Drawings

OLEFIN POLYMERIZATION PROCESS

FIELD OF THE INVENTION

This invention relates to a process for polymerizing an olefin with an activator and a supported organometallic complex. The process gives improved catalyst activity and polyolefins with increased molecular weight.

BACKGROUND OF THE INVENTION

Many olefin polymerization catalysts are known, including conventional Ziegler-Natta catalysts. While these catalysts are inexpensive, they exhibit low activity and are generally poor at incorporating α-olefin comonomers. To improve polymer properties, single-site catalysts, in particular metallocenes are beginning to replace Ziegler-Natta catalysts.

Catalyst precursors that incorporate a transition metal and an indenoindolyl ligand are known. U.S. Pat. Nos. 6,232,260 and 6,451,724 disclose the use of transition metal catalysts based upon indenoindolyl ligands, but have no examples using supported catalysts. While they mention that supported catalysts may be used, little information is given about the preparation of the supported catalysts.

WO 01/53360 discloses open architecture indenoindolyl catalysts that may be supported. In the single example (Example 8) preparing a supported catalyst, a solution of the catalyst is added to a polyethylene support.

U.S. Pat. No. 6,559,251 discloses a process for polymerizing olefins with a silica-supported, indenoindolyl Group 4–6 transition metal complex having open architecture.

U.S. Pat. No. 6,541,583 discloses a process for polymerizing propylene in the presence of a Group 3–5 transition metal catalyst that has two non-bridged indenoindolyl ligands. None of the examples uses a supported catalyst. They state that the catalyst can be immobilized on a support but give no process details.

U.S. Pat. No. 6,211,311 prepares supported catalysts containing heteroatomic ligands. The support is chemically modified with an organoaluminum, organosilicon, organomagnesium or organoboron compound for improved catalyst stability and activity. There is no indication that zinc compounds may be used, and there is no indication that increased polymer molecular weight may be obtained.

Pending application Ser. No. 10/123,774, filed Apr. 16, 2002, discloses a process for polymerizing ethylene in the presence of a silica-supported Group 3–10 transition metal catalyst that has two bridged indenoindolyl ligands. This application teaches that the silica can be chemically treated and points to the above-mentioned U.S. Pat. No. 6,211,311.

Organozinc compounds such as diethylzinc have been used in olefin polymerizations as chain transfer agents to lower molecular weight. For example, U.S. Pat. Nos. 6,524,986; 6,489,408; 6,476,173 and 6,221,802 mention the use of diethylzinc to control molecular weight by acting as a chain transfer agent similarly to how hydrogen is often used to lower molecular weight. None teaches treatment of a support with an organozinc compound prior to combining it with an organometallic complex.

*Macromolecules* 27 7938–7940 (1994) teaches polymerization of methyl methacrylate by dicyclopentadienyldimethyl zirconium by reacting the methyl methacrylate with diethylzinc prior to unsupported catalyst addition and polymerization.

U.S. Pat. No. 6,177,527 teaches an olefin polymerization process using racemic and meso stereoisomers of a metallocene catalyst containing two cycloalkadienyl ligands. They state that it is preferred not to use a support, but give a long list of possible supports including silica with diethylzinc. No further teachings are found nor are the catalysts used based upon indenoindolyl systems.

Despite the considerable work that has been done with catalysts based upon indenoindolyl ligands there is a need for improvement, especially with regard to increasing activity and molecular weight. Organozinc compounds have apparently not been used in conjunction with organometallic complexes that incorporate indenoindolyl ligands. When organozinc compounds are mentioned for use in olefin polymerizations with metallocene catalysts they act as chain transfer agents and reduce polyolefin molecular weight, the opposite of the effect I have found with complexes containing indenoindolyl ligands.

SUMMARY OF THE INVENTION

In one aspect, the invention is a method for preparing a supported organometallic complex. An organometallic complex is combined with a support material that has been treated with an organozinc compound. The organometallic complex comprises a Group 3 to 10 transition metal and an indenoindolyl ligand that is bonded to the transition metal.

In another aspect, the invention is a process for polymerizing an olefin. The supported organometallic complex described above is mixed with an activator and an olefin, and the olefin is polymerized. Pretreatment of the support with an organozinc compound combined with the use of an indenoindolyl transition metal complex provides an unexpected boost in both catalyst activity and polyolefin molecular weight.

DETAILED DESCRIPTION OF THE INVENTION

The invention includes a method for preparing a supported organometallic complex. The complex contains a Group 3 to 10 transition metal. Preferably the transition metal is a Group 3–5 transition metal, more preferably a Group 4 transition metal. Most preferably, the transition metal is zirconium.

The organometallic complex contains at least one indenoindolyl ligand bonded to the transition metal. "Indenoindolyl" ligands are conveniently generated by deprotonating an indenoindole compound using a potent base. By "indenoindole compound," we mean an organic compound that has both indole and indene rings. The five-membered rings from each are fused, i.e., they share two carbon atoms. The rings can be fused such that the indole nitrogen and the only sp$^3$-hybridized carbon on the indenyl ring are "trans" to each other. Such is the case in an indeno[1,2-b]indole ring system such as:

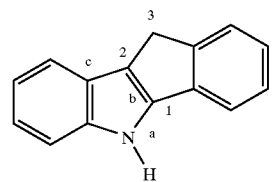

Suitable ring systems also include those in which the indole nitrogen and the sp$^3$-hybridized carbon of the indene are beta to each other, i.e., they are on the same side of the molecule. This is an indeno[2,1-b]indole ring system:

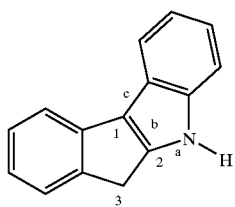

The ring atoms can be unsubstituted or substituted with one or more groups such as alkyl, aryl, aralkyl, halogen, silyl, nitro, dialkylamino, diarylamino, alkoxy, aryloxy, thioether, or the like. Additional fused rings can be present, as long as an indenoindole moiety is present.

Numbering of indenoindoles follows IUPAC Rule A-22. The molecule is oriented as shown below, and numbering is done clockwise beginning with the ring at the uppermost right of the structure in a manner effective to give the lowest possible number to the heteroatom. Thus, 5,10-dihydroindeno[1,2-b]indole is numbered as follows:

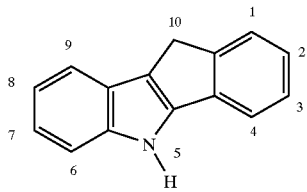

while 5,6-dihydroindeno[2,1-b]indole has the numbering:

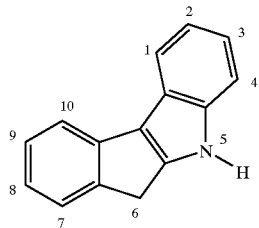

For correct nomenclature and numbering of these ring systems, see the *Ring Systems Handbook* (1998), a publication of Chemical Abstracts Service, Ring Systems File II: RF 33986-RF 66391 at RF 58952 and 58955. (Other examples of correct numbering appear in PCT Int. Appl. WO 99/24446 and U.S. Pat. No. 6,440,889.)

Methods for making indenoindole compounds are well known. Suitable methods and compounds are disclosed, for example, in U.S. Pat. No. 6,232,260, the teachings of which are incorporated herein by reference, and references cited therein, including the method of Buu-Hoi and Xuong, *J. Chem. Soc.* (1952) 2225. Suitable procedures also appear in PCT Int. Appls. WO 99/24446 and WO 01/53360.

The indolyl nitrogen of each indenoindolyl group is typically substituted with an alkyl, aryl, dialkylboryl, trialkylsilyl, or a divalent linking group.

Preferably, the indenoindolyl ligand is a bridged indenoindolyl ligand. By "bridged indenoindolyl ligand," we mean that the indenoindolyl group can be joined to a second ligand by a divalent linking group. A wide variety of linking groups are suitable for use and are described in the art. The linking group can be a conjugated pi-electron system, but it need not be conjugated. Suitable divalent linking groups include dialkylsilyl, diarylsilyl, alkylboranyl, arylboranyl, siloxy, polysiloxy, and hydrocarbyl groups. Preferred hydrocarbyl groups are alkylene, dialkylene, polyalkylene, arylene, diarylene, polyarylene, cycloalkyl, adamantyl, aralkylene, alkenyl, and alkynyl. Specific examples of suitable divalent linking groups are methylene, 1,2-ethenyl, 1,2-ethynyl, isopropylidene, 1,4-phenylene, α,α'-xylyl, 4,4'-biphenylene, 1,3-adamantyl, 1,4-adamantyl, phenylboranyl, methylboranyl, dimethylsilyl, diphenylsilyl, bis(dimethylsilyl), oxybis(dimethylsilyl), and the like. These and other divalent linking groups are described in the background references. (For some examples, see *J. Organometal. Chem.* 460 (1993) 191; 518 (1996) 1; 580 (1999) 90.)

The divalent linking group can link the indenoindolyl ligand to a polymerization-stable ligand. Suitable polymerization-stable ligands include cyclopentadienyl, indenyl, fluorenyl, boraaryl, indenoindolyl, and the like.

Bridged indenoindolyl ligands also include those used in open architecture complexes. By "open architecture," we mean a complex having a fixed geometry that enables generation of a highly exposed active site when the catalyst is combined with an activator. The metal of the complex is pi-bonded to the indenyl Cp ring and is also sigma-bonded through two or more atoms to the indolyl nitrogen or the indenyl methylene carbon. Preferably, the metal is sigma-bonded to a heteroatom, i.e., oxygen, nitrogen, phosphorus, or sulfur; most preferably, the metal is sigma-bonded to nitrogen. The heteroatom is linked to the indenoindolyl group through a bridging group, which is preferably dialkylsilyl, diarylsilyl, methylene, ethylene, isopropylidene, diphenylmethylene, or the like. Particularly preferred bridging groups are dimethylsilyl, methylene, ethylene, and isopropylidene. The bridging group is covalently bonded to either the indolyl nitrogen atom or the indenyl methylene carbon.

Preferred bridged indenoindolyl ligands have a structure selected from the group consisting of:

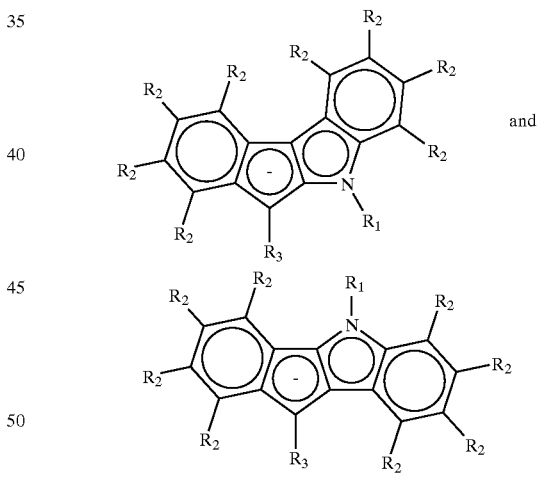

in which $R_1$ is selected from the group consisting of $C_1$–$C_{30}$ hydrocarbyl, dialkylboryl, trialkylsilyl, and divalent radicals connected to a second ligand; each $R_2$ is independently selected from the group consisting of $C_1$–$C_{30}$ hydrocarbyl, H, F, Cl and Br; $R_3$ is selected from the group consisting of $C_1$–$C_{30}$ hydrocarbyl, H and divalent radicals connected to a second ligand with the proviso that one of $R_1$ or $R_3$ is a divalent radical connected to a second ligand wherein the divalent radical is selected from the group consisting of hydrocarbyl and heteroatom containing alkylene radicals, diorganosilyl radicals, diorganogermanium radicals and diorganotin radicals.

Additionally, the complex includes ancillary ligands that are bonded to the metal and satisfy the valence of the metal.

The ancillary ligands can be labile or polymerization-stable, but usually at least one labile ligand (such as halides, alkoxys, aryloxys, alkyls, arylalkyls, aryls, dialkylaminos, or the like) is present. Particularly preferred labile ligands are halides, alkyls, arylalkyls (e.g., chloride, methyl, benzyl) and aryloxys (e.g. phenoxy).

Preferably, the bridged indenoindolyl complex has the general structure:

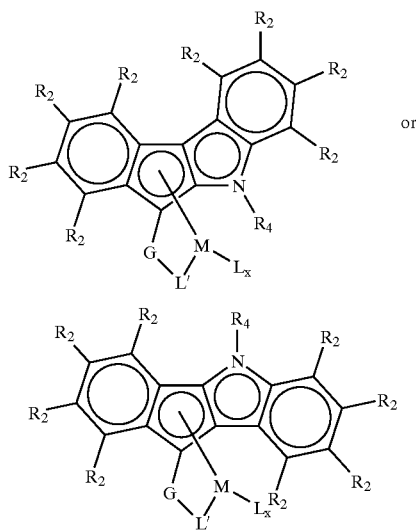

or wherein M is a Group 3 to 10 transition metal; each L is independently selected from the group consisting of halide, alkoxy, aryloxy, siloxy, alkylamino, and $C_1$–$C_{30}$ hydrocarbyl; L' is selected from the group consisting of alkylamido, substituted or unsubstituted cyclopentadienyl, fluorenyl, indenyl, boraaryl, pyrrolyl, azaborolinyl and indenoindolyl; x satisfies the valence of M; $R_4$ is selected from the group consisting of $C_1$–$C_{30}$ hydrocarbyl, dialkylboryl and trialkylsilyl; each $R_2$ is independently selected from the group consisting of $C_1$–$C_{30}$ hydrocarbyl, H, F, Cl and Br; G is a divalent radical is selected from the group consisting of hydrocarbyl and heteroatom-containing alkylene radicals, diorganosilyl radicals, diorganogermanium radicals and diorganotin radicals.

Other preferred bridged indenoindolyl complexes have the general structure:

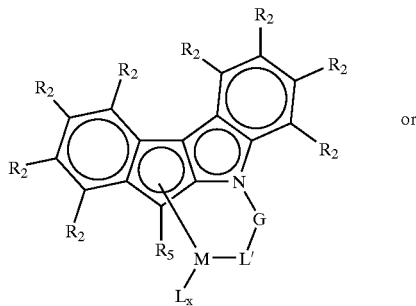

or

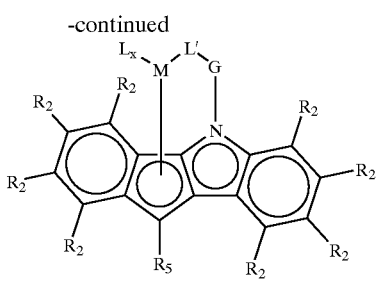

wherein M is a Group 3 to 10 transition metal; each L is independently selected from the group consisting of halide, alkoxy, aryloxy, siloxy, alkylamino, and $C_1$–$C_{30}$ hydrocarbyl; L' is selected from the group consisting of alkylamido, substituted or unsubstituted cyclopentadienyl, fluorenyl, indenyl, boraaryl, pyrrolyl, azaborolinyl and indenoindolyl; x satisfies the valence of M; $R_5$ is selected from the group consisting of $C_1$–$C_{30}$ hydrocarbyl and H; each $R_2$ is independently selected from the group consisting of $R_5$, F, Cl and Br; G is a divalent radical is selected from the group consisting of hydrocarbyl and heteroatom containing alkylene radicals, diorganosilyl radicals, diorganogermanium radicals and diorganotin radicals.

The unsupported complexes can be made by any suitable method; those skilled in the art will recognize a variety of acceptable synthetic strategies. Often, the synthesis begins with preparation of the desired indenoindole compound from particular indanone and arylhydrazine precursors. Treatment with base gives a ligand precursor. The indenoindole is linked with a second polymerization-stable ligand to give a linked ligand precursor. The final step normally involves reaction of the ligand precursor with a transition metal source to give the organometallic complex. The exact synthetic steps and the sequence used will normally depend upon the other ligands used and the transition metal source.

One aspect of the invention is a method for preparing a supported organometallic complex. An organometallic complex as described above is combined with a support material that has been treated with an organozinc compound. The organozinc compound is preferably a diarylzinc or a dialkylzinc. Dialkylzincs such as dimethylzinc, diethylzinc or dibutylzinc are preferred. Of these, diethylzinc is most preferred. The amount of organometallic complex added per g support material is preferably from 0.01 mmol per gram to 0.8 mmol per gram.

The support material is preferably a porous material such as inorganic oxides and chlorides, and organic polymer resins. Preferred inorganic oxides include oxides of Group 2, 3, 4, 5, 13, or 14 elements. Preferred supports include silica, alumina, silica-aluminas, magnesias, titania, zirconia, magnesium chloride, and crosslinked polystyrene. Most preferably, the support is silica.

Preferably, the silica has a surface area in the range of about 10 to about 1000 $m^2$/g, more preferably from about 50 to about 800 $m^2$/g and most preferably from about 200 to about 700 $m^2$/g. Preferably, the pore volume of the silica is in the range of about 0.05 to about 4.0 mL/g, more preferably from about 0.08 to about 3.5 mL/g, and most preferably from about 0.5 to about 3.0 mL/g. Preferably, the average particle size of the silica is in the range of about 1 to about 500 μm, more preferably from about 2 to about 200 μm, and most preferably from about 5 to about 100 μm. The average pore diameter is typically in the range of about 5 to about 1000 angstroms, preferably about 10 to about 500 angstroms, and most preferably about 20 to about 350 angstroms. Preferably, the silica is dried before use, preferably at a temperature of from about 100° C. to about 800° C., more preferably from about 150° C. to about 600° C.

In a preferred method for making the organozinc-treated support, the support material is dried, a solution of the organozinc compound is mixed with the support material, and volatiles are removed. Mixing a solution of the organozinc compound with the support material for about 30 minutes gives good results. An incipient-wetness technique can also be used in which a concentrated solution of the organozinc compound is evenly distributed on the dry support, and the resulting treated support is a free-flowing powder. Preferably, the support is treated with about 0.1 to about 2 moles of organozinc compound per kg of support. If the amount of organozinc compound is too low, the beneficial effect is not seen and at very high levels, no further benefit is obtained.

The supported organometallic complex is preferably made by adding a solution of the complex to the organozinc-treated support material. Preferably, the mixture is stirred in an inert atmosphere at a temperature of from about 0° C. to about 120° C., more preferably from about 20° C. to about 40° C. The optimum stirring time will vary somewhat, depending upon the amounts of solvent and support material, but should be long enough to ensure good mixing. Preferably, the stirring time is from about 2 minutes to about 120 minutes. Stirring longer than 120 minutes should not decrease activity, but it is unnecessary. Stirring 30 minutes at room temperature is convenient and gives good results. Alternatively, an incipient-wetness technique can be used to deposit the complex on the organozinc-treated support.

The invention includes an olefin polymerization process. Suitable olefins for the polymerization are $C_2$–$C_{20}$ α-olefins, such as ethylene, propylene, 1-butene, 1-hexene and 1-octene, cyclic olefins such as cyclopentene and cyclohexene and nonconjugated dienes such as ethylidene norbornene and mixtures thereof. Preferred olefins are ethylene, propylene and mixtures thereof with α-olefins such as 1-butene, 1-hexene and 1-octene. More preferably ethylene is copolymerized with a $C_3$–$C_{20}$ α-olefin. Most preferably, ethylene is copolymerized with 1-butene, 1-hexene or 1-octene.

Hydrogen is optionally used in the polymerization to regulate the molecular weight. The amount of hydrogen needed depends upon the desired polyolefin molecular weight and flow. Generally, as the amount of hydrogen is increased, the polyolefin molecular weight decreases and the flow increases. For many applications, the polyolefin flow will be too low if the polymerization is done in the absence of hydrogen.

The olefin is polymerized in the presence of an activator. Suitable activators include alumoxanes, alkyl aluminum compounds, organoboranes, ionic borates, ionic aluminates, aluminoboronates and mixtures thereof. Examples include methyl alumoxane (MAO), polymeric MAO (PMAO), ethyl alumoxane, diisobutyl alumoxane, lithium tetrakis (pentafluorophenyl) borate, dimethylanilinium tetrakis (pentafluoro-phenyl)borate, trityl tetrakis (pentafluorophenyl)borate, tris(pentafluoro-phenyl)borane, triphenylborane, tri-n-octylborane, and the like, and mixtures thereof. Preferably, the activator is methylalumoxane. Selection of activator depends on many factors including the organometallic complex used and the desired polymer properties.

There are many suitable ways to introduce the activator. For example, the activator can be added directly to the polymerization reactor. In one preferred embodiment, a solution of the activator is added to the organozinc-treated support material prior to the addition of the organometallic complex. More preferably, the organometallic complex is premixed with a solution of the activator prior to addition to the organozinc-treated support material. Preferably, the organometallic complex and activator solution are premixed for a period of time between 1 minute and two hours. When the organometallic complex is premixed with a solution of the activator, optionally a portion of the activator can be premixed and the remainder of the activator added to the reactor.

Preferably, a scavenging amount of an alkyl aluminum compound such as triethyl aluminum or triisobutyl aluminum is also added to the polymerization reactor. Preferably, the alkyl aluminum compound is added to the reactor prior to the addition of the supported complex.

A wide variety of olefin polymerization processes can be used. Preferred processes are slurry, bulk, solution, and gas-phase processes. A slurry or gas-phase process is preferably used.

The polymerizations can be performed over a wide temperature range, such as about −30° C. to about 280° C. A more preferred range is from about 10° C. to about 180° C.; most preferred is the range from about 30° C. to about 100° C. Olefin partial pressures normally range from about 15 psia to about 50,000 psia. More preferred is the range from about 15 psia to about 1000 psia.

Catalyst concentrations used for the olefin polymerization depend on many factors. Preferably, however, the concentration ranges from about 0.01 micromoles transition metal per liter to about 100 micromoles per liter. Polymerization times depend on the type of process, the catalyst concentration, and other factors. Generally, polymerizations are complete within several seconds to several hours.

The following examples merely illustrate the invention. Those skilled in the art will recognize many variations that are within the spirit of the invention and scope of the claims.

EXAMPLE 1

Synthesis of 1,1-bis[6-(2,5-dimethyl-5,6-dihydro-indeno[2,1-b])indolyl]methane zirconium dichloride, 1-4

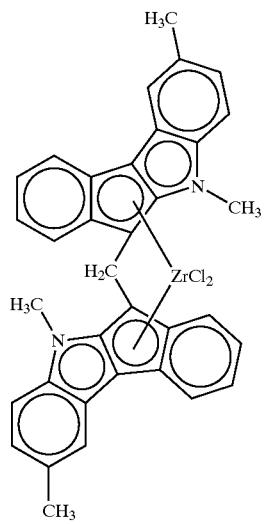

1-4

(a) Preparation of 5,6-dihydro-2-methyl-indeno[2,1-b] indole 1-1. A mixture of 2-indanone (51.0 g, 0.39 mol) and p-tolylhydrazine hydrochloride (61.4 g, 0.39 mol) is dissolved in glacial acetic acid (525 mL) and is vigorously stirred and heated to reflux. The mixture turns red and is heated for 2 hours. After cooling to room temperature, it is poured into ice water (1 L). The precipitate is filtered to afford a solid, which is washed with water (about 1 L). The solid is dissolved in ethyl acetate (1.4 L), activated charcoal is added, and the mixture is gently warmed. The mixture is then cooled and filtered over a pad of Celite. The filtrate is dried over sodium sulfate, filtered, and is then concentrated to 450 mL and cooled to −30° C. for 3 days. The crystalline solid is filtered and washed with chilled (−78° C.) hexanes (2×500 mL). The beige solid is collected and dried under vacuum (47.1 g, 56%).

(b) N-Methylation of 1-1 to give 1-2. A slurry of aqueous sodium hydroxide (42 mL, 21.5 M, 903 mmol), $C_{16}H_{33}NMe_3Br$ (0.36 g, 0.97 mmol), and 1-1 (15.0 g, 68.4 mmol) is combined with toluene (50 mL). A solution of methyl iodide (8.0 mL, 129 mmol) in toluene (15 mL) is added dropwise at room temperature. The mixture is stirred at room temperature for 2.5 hours and then refluxed for an hour. The mixture turns red and is cooled to room temperature and filtered. The crystalline solid is washed with chilled (−30° C.) ethanol (200 mL) followed by chilled hexanes (200 mL) to afford a pale red solid (10.3 g, 65%).

(c) Preparation of 1,1-bis[6-(2,5-dimethyl-5,6-dihydroindeno[2,1-b])indolyl)]methane 1-3. A slurry of 1-2 (9.32 g, 39.9 mmol) in degassed DMF (150 mL) is warmed to 70° C., and sodium ethoxide (1.37 g, 20.1 mmol) is added under nitrogen. The solid dissolves to afford a dark orange solution. Formaldehyde (1.6 mL, 37 wt % in $H_2O$, 20.8 mmol) is added after an hour, and a precipitate formed after 20 min. Solid ammonium chloride (2.55 g, 47.7 mmol) is added, the mixture filtered, and the solid washed with DMF (50 mL) followed by diethylether (50 mL). The solid is dissolved in methylene chloride (1.3 L) and washed with water (1 L). The layers are separated, and the organics dried over sodium sulfate and filtered. The volatiles are removed under reduced pressure, and the solid dried under vacuum (4.12 g, 42.8%).

(d) Preparation of 1,1-bis[6-(2,5-dimethyl-5,6-dihydroindeno[2,1-b])indolyl]methane zirconium dichloride, 1-4 A mixture of 1-3 (2.18 g, 4.55 mmol) and diethylether (80 mL) is cooled to −78° C., and n-butyl lithium (4.0 mL, 2.5 M in hexanes, 10.0 mmol) added by syringe. The cold bath is removed, and a yellow solid formed upon warming to 23° C. The volatiles are removed after 18 hours, and the solid washed with diethylether (20 mL) and dried under vacuum (1.84 g, 82.5%). The dianion (1.84 g, 3.75 mmol) is added to a solution of zirconium tetrachloride (0.88 g, 3.77 mmol) in toluene (80 mL) and diethylether (30 mL) to afford a red mixture, which is stirred overnight, filtered and dried under vacuum (2.57 g, 78.2%).

EXAMPLE 2

Preparation of Catalyst Supported on Diethylzinc-treated Silica

In a glove-box under nitrogen, 2.0 mL of 1.0 M diethylzinc in heptane is mixed with 2.00 g of G955 silica (available from Grace Davison) having a surface area (BET) of 280–355 m²/g and a pore volume of 1.55–2.00 mL/g that had been calcined at 250° C. After mixing at room temperature for about 0.5 hour, volatiles are removed by vacuum to obtain 2.30 g of diethylzinc treated silica.

1.8 mL of 30% by weight methylalumoxane (MAO) in toluene is diluted by mixing with 3.6 mL toluene. Complex 1-4 (13.8 mg, 0.019 mmole) is mixed with the diluted MAO solution to make a deep green-blue solution. This green-blue solution is mixed further with 1.00 g of diethylzinc treated silica prepared above. After stirring for 30 minutes at room temperature, the volatiles are removed by vacuum to obtain 1.68 g of the supported catalyst as a dark green powder.

COMPARATIVE EXAMPLE 3

Preparation of Catalyst Supported on Non-treated Silica 1.8 mL of 30% by weight methylalumoxane (MAO) in toluene is diluted by mixing with 3.6 mL toluene. Complex 1-4 (13.8 mg, 0.019 mmole) is mixed with the diluted MAO solution to make a deep green-blue solution. This green-blue solution is mixed further with 1.00 g of G955 silica (available from Grace Davison) that had been calcined at 250° C. After stirring for 30 minutes at room temperature, the volatiles are removed by vacuum to obtain 1.68 g of the supported catalyst as a dark green powder.

EXAMPLE 4

Copolymerization of Ethylene and 1-Hexene

Hydrogen is added (2.8 delta MPa from a 10-mL stainless-steel cylinder pressurized initially to 4.5 MPa $H_2$) to a one-liter, stainless-steel reactor which is then charged with 1-hexene (10 mL). Triisobutylaluminum (0.5 mL of 1.0 M solution in heptane, 0.5 mmol) and Stadis fatty amine (12 mg, product of Akzo Nobel) in heptane solution (3.0 mL) are mixed in one sidearm of the injector. This mixture is then flushed into the reactor with nitrogen pressure and isobutane (about 400 mL) and then pressurized with ethylene to 2.4 MPa. The reactor contents are allowed to equilibrate at 80° C. The supported catalyst from Example 2 (29 mg) is loaded into the other injector arm and then flushed into the reactor with isobutane (90 mL) and nitrogen pressure. After 15 minutes, more hydrogen is added (2.8 delta MPa from a 10-mL stainless-steel cylinder pressurized initially to 4.5 MPa $H_2$). The polymerization proceeds for another 15 minutes for a total of 0.5 hour. The reactor is vented and the polyolefin copolymer is collected and dried. Catalyst activity is 6.8 kg polyolefin per g supported catalyst per hour. The weight average ($M_w$) molecular weight and polydispersity ($M_w/M_n$) of the polymer are measured by gel permeation chromatography (GPC) using 1,3,5-trichlorobenzene at 145° C. to be 98,000 and 4.4. The melt index (MI) is measured according to ASTM D-1238, Condition E to be 0.1 dg/min.

COMPARATIVE EXAMPLE 5

Copolymerization without Organozinc Compound

The polymerization procedure of Example 4 is generally followed with the supported catalyst from Comparative Example 3. Catalyst activity is 4.0 kg polyolefin per g supported catalyst per hour; $M_w$=77,000; $M_w/M_n$=4.8; and MI=0.7 dg/min.

Example 4 shows that by treating a support with an organozinc compound, the catalyst activity is increased, the molecular weight is increased and MI is decreased versus Comparative Example 5.

The preceding examples are meant only as illustrations. The following claims define the invention.

I claim:

1. A process which comprises polymerizing an olefin in the presence of an activator and a supported organometallic complex, wherein the supported organometallic complex is prepared by treating a support with about 0.1 to about 2 moles of an organozinc compound per kg support and combining the organozinc-treated support with an organometallic complex comprising a Group 3 to 10 transition metal, M, and at least one indenoindolyl ligand that is bonded to M.

2. The process of claim 1 wherein the Group 3 to 10 transition metal is a Group 4 transition metal.

3. The process of claim 1 wherein the activator is selected from the group consisting of alumoxanes, alkylaluminum compounds, organoboranes, ionic borates, ionic aluminates, aluminoboronates and mixtures thereof.

4. The process of claim 1 wherein some or all of the activator is premixed with the organometallic complex, and this mixture is added to the organozinc-treated support.

5. The process of claim 1 wherein the olefin is selected from the group consisting of ethylene, propylene, 1-butene, 1-pentene, 1-hexene and 1-octene and mixtures thereof.

6. The process of claim 5 wherein the olefin is ethylene in combination with a second olefin selected from the group consisting of 1-butene, 1-hexene and 1-octene.

7. The process of claim 1 wherein the organozinc compound is selected from the group consisting of dimethylzinc and diethylzino.

8. The process of claim 1 wherein the support is selected from the group consisting of silicas, aluminas, and silica-aluminas.

9. The process of claim 1 wherein the polymerization is performed at a temperature within the range of about 300° C. to about 1000° C.

10. A slurry polymerization process of claim 1.

11. A gas-phase polymerization process of claim 1.

12. The process of claim 1 wherein the indenoindolyl ligand has a structure selected from the group consisting of:

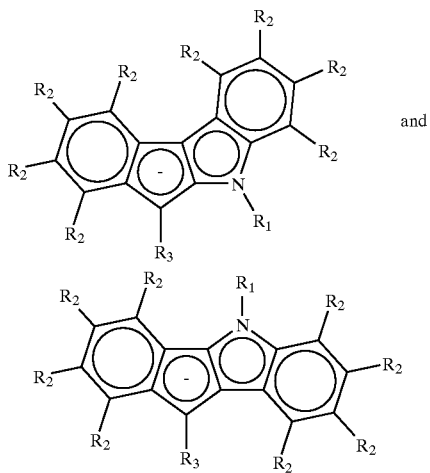

in which $R_1$ is selected from the group consisting of $C_1-C_{30}$ hydrocarbyl, dialkylboryl, trialkylsilyl and divalent radicals connected to a second ligand; each $R_2$ is independently selected from the group consisting of $C_1-C_{30}$ hydrocarbyl, H, F, Cl and Br; $R_3$ is selected from the group consisting of $C_1-C_{30}$ hydrocarbyl, H and divalent radicals connected to a second ligand wherein one of $R_1$ or $R_3$ is a divalent radical selected from the group consisting of hydrocarbyl and heteroatom containing alkylene radicals, diorganosilyl radicals, diorganogermanium radicals and diorganotin radicals.

13. The process of claim 1 wherein the organometallic complex has a structure selected from the group consisting of:

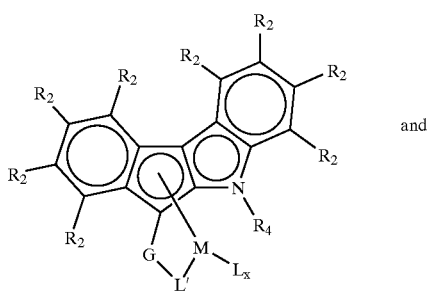

and

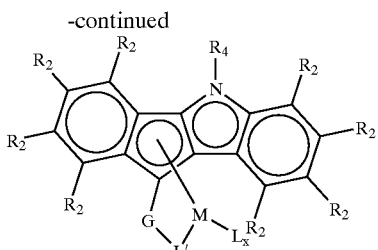

wherein M is a Group 3 to 10 transition metal; each L is independently selected from the group consisting of halide, alkoxy, aryloxy, siloxy, alkylamino, and $C_1-C_{30}$ hydrocarbyl; L' is selected from the group consisting of alkylamido, substituted or unsubstituted cyclopentadienyl, fluorenyl, indenyl, boraaryl, pyrrolyl, azaborolinyl and indenoindolyl; x satisfies the valence of M; $R_4$ is selected from the group consisting of $C_1-C_{30}$ hydrocarbyl, dialkylboryl and trialkylsilyl; each $R_2$ is independently selected from the group consisting of $C_1-C_{30}$ hydrocarbyl, H, F, Cl and Br; G is a divalent radical selected from the group consisting of hydrocarbyl and heteroatom containing alkylene radicals, diorganosilyl radicals, diorganogermanium radicals and diorganotin radicals.

14. The process of claim 13 wherein L' is selected from the group consisting of substituted or unsubstituted cyclopentadienyl, fluorenyl, indenyl, and indenoindolyl.

15. The process of claim 1 wherein the organometallic complex has a structure selected from the group consisting of:

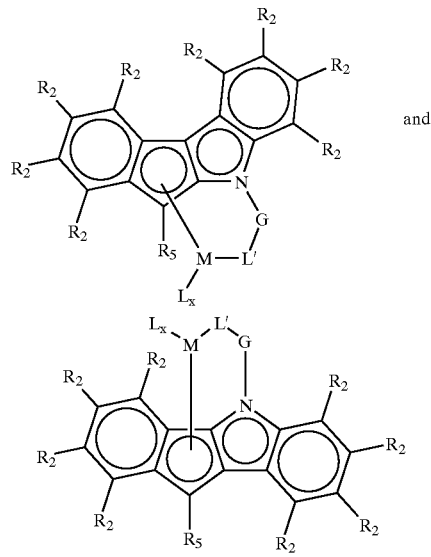

wherein M is a Group 3 to 10 transition metal; each L is independently selected from the group consisting of halide, alkoxy, aryloxy, siloxy, alkylamino, and $C_1-C_{30}$ hydrocarbyl; L' is selected from the group consisting of alkylamido, substituted or unsubstituted cyclopentadienyl, fluorenyl, indenyl, boraaryl, pyrrolyl, azaborolinyl and indenoindolyl; x satisfies the valence of M; $R_5$ is selected from the group consisting of $C_1-C_{30}$ hydrocarbyl and H,; each $R_2$ is independently selected from the group consisting of $R_5$, F, Cl and Br, G is a divalent radical selected from the group consisting of hydrocarbyl and heteroatom containing alkylene radicals, diorganosilyl radicals, diorganogermanium radicals and diorganotin radicals.

16. A method which comprises treating a support with about 0.1 to about 2 moles of an organozinc compound per kg support and combining the treated support with an organometallic complex comprising a Group 3 to 10 transition metal, M, and at least one indenoindolyl ligand that is bonded to M.

17. The method of claim 16 wherein the support is selected from the group consisting of silicas, aluminas, and silica-aluminas.

18. The method of claim 16 wherein the organozinc compound is selected from the group consisting of dimethylzinc and diethylzinc.

19. The method of claim 16 wherein the organometallic complex has a structure selected from the group consisting of:

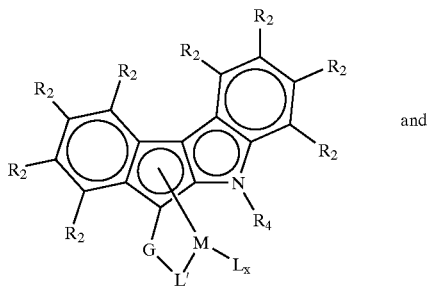

and

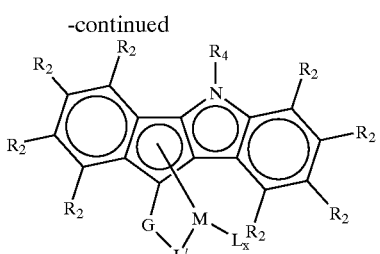

wherein M is a Group 4 transition metal; each L is independently selected from the group consisting of halide, alkoxy, aryloxy, siloxy, alkylamino, and $C_1$–$C_{30}$ hydrocarbyl; L' is selected from the group consisting of alkylamido, substituted or unsubstituted cyclopentadienyl, fluorenyl, indenyl, boraaryl, pyrrolyl, azaborolinyl and indenoindolyl; x satisfies the valence of M; $R_4$ is selected from the group consisting of $C_1$–$C_{30}$ hydrocarbyl, dialkylboryl and trialkylsilyl; each $R_2$ is independently selected from the group consisting of $C_1$–$C_{30}$ hydrocarbyl, H, F, Cl and Br; G is a divalent radical selected from the group consisting of hydrocarbyl and heteroatom containing alkylene radicals, diorganosilyl radicals, diorganogermanium radicals and diorganotin radicals.

20. The method of claim 16 wherein the complex is premixed with an activator prior to combining with the organozinc-treated support.

21. The method of claim 16 wherein the organozinc-treated support is combined with an activator prior to combining with the organometallic complex.

* * * * *